United States Patent
Hiebert et al.

(10) Patent No.: US 9,513,947 B2
(45) Date of Patent: *Dec. 6, 2016

(54) ADAPTIVE VIRTUAL MACHINE REQUEST APPROVER

(71) Applicant: International Business Machines Corporation, Armonk, NY (US)

(72) Inventors: Daniel L. Hiebert, Pine Island, MN (US); Brian R. Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/523,643

(22) Filed: Oct. 24, 2014

(65) Prior Publication Data
US 2015/0355932 A1  Dec. 10, 2015

Related U.S. Application Data

(63) Continuation of application No. 14/299,462, filed on Jun. 9, 2014.

(51) Int. Cl.
| | |
|---|---|
| G06F 9/44 | (2006.01) |
| G06F 9/455 | (2006.01) |
| G06F 9/46 | (2006.01) |

(52) U.S. Cl.
CPC ............. *G06F 9/45558* (2013.01); *G06F 8/24* (2013.01); *G06F 8/71* (2013.01); *G06F 9/4428* (2013.01); *G06F 9/465* (2013.01); *G06F 2009/45579* (2013.01); *G06F 2009/45591* (2013.01)

(58) Field of Classification Search
CPC ......... G06F 8/443; G06F 8/76; G06F 9/4553
See application file for complete search history.

(56) References Cited

U.S. PATENT DOCUMENTS

| | | | |
|---|---|---|---|
| 2008/0134177 A1 | 6/2008 | Fitzgerald et al. | |
| 2009/0006534 A1 | 1/2009 | Fries et al. | |

(Continued)

FOREIGN PATENT DOCUMENTS

| | | |
|---|---|---|
| EP | 0387462 B1 | 9/1990 |

OTHER PUBLICATIONS

Anton Beloglazov and Rajkumar Buyya, Optimal Online Deterministic Algorithms and Adaptive Heuristics for Energy and Performance Efficient Dynamic Consolidation fo Virtual Machines in Cloud Data Centers, 2012, retrieved online on Aug. 10, 2016, pp. 1-24. Retrieved from the Internet: <URL: http://www.cloudbus.org/~raj/papers/Optimal-VM-Consolidation-C>.*

(Continued)

*Primary Examiner* — Thuy Dao
*Assistant Examiner* — Hanh T Bui
(74) *Attorney, Agent, or Firm* — Matthew J. Bussan

(57) ABSTRACT

An adaptive request handler (ARH) receives a virtual machine (VM) request from a user and determines whether to automatically approve the VM request using a tolerance that defines an allowable amount of deviation from preset resource specifications. In some embodiments, the ARH adaptively varies the tolerance based on one or more monitored factors, such as an aggregate system resource utilization by and/or a billing history of the user or a group that includes the user. In some embodiments, the VM request is based on a template selected by the user from among a plurality of templates eligible for automatic approval, wherein a plurality of tolerances each defines an allowable amount of deviation from preset resource specifications of a respective one of the eligible templates. The ARH may, in some embodiments, vary each of the plurality of tolerances independently based on one or more monitored factors.

9 Claims, 11 Drawing Sheets

(56) References Cited

U.S. PATENT DOCUMENTS

| | | | |
|---|---|---|---|
| 2010/0138829 A1* | 6/2010 | Hanquez | G06F 9/5077 718/1 |
| 2012/0291030 A1* | 11/2012 | Fitzgerald | G06F 21/53 718/1 |
| 2013/0042003 A1 | 2/2013 | Franco et al. | |
| 2013/0139152 A1* | 5/2013 | Chang | G06F 9/45545 718/1 |
| 2014/0007097 A1* | 1/2014 | Chin | G06F 9/45533 718/1 |
| 2014/0380412 A1* | 12/2014 | Fitzgerald | G06F 21/51 726/1 |
| 2015/0040127 A1* | 2/2015 | Dippenaar | G06F 9/4856 718/1 |
| 2015/0186176 A1* | 7/2015 | Kodi | G06F 9/45558 718/1 |
| 2016/0055026 A1* | 2/2016 | Fitzgerald | G06F 21/51 718/1 |
| 2016/0139948 A1* | 5/2016 | Beveridge | G06F 9/45558 718/1 |
| 2016/0162323 A1* | 6/2016 | Mandava | G06F 9/45558 718/1 |
| 2016/0179567 A1* | 6/2016 | Ding | G06F 9/45558 718/1 |

OTHER PUBLICATIONS

Stefan Groesbrink et al., Archtecture for Adaptive Resource Assignment to Virtualized Mixed-Criticality Real-Time Systems, 2013, retrieved online on Aug. 10, 2016, pp. 18-23. Retrieved from the Internet: <URL: http://delivery.acm.org/10.1145/2500000/2492388/p18-groesbrink.pdf?>.*

"Method to optimize cloud delivery services, by recommending best-fit virtual machine image, to enhance user experience," IP.com Prior Art Database Technical Disclosure, IPCOM000225113D, Jan. 24, 2013, 10 pages.

"VMware vCenter Lifecycle Manager: Automate and control virtual machine provisioning," VMware, Inc., 2009, 2 pages.

"VMware vCloud Request Manager: Deploy Private Clouds with Confidence and Control," VMware, Inc., 2010, 2 pages.

Jiang et al., "Cloud Analytics for Capacity Planning and Instant VM Provisioning," IEEE Transactions on Network and Service Management, 2013, 14 pages.

Boleman et al., "IBM SmartCloud Entry 2.4: Deployment Use Cases," International Business Machines Corporation, ibm.com/redbooks, Feb. 2013, 88 pages.

Mell et al., "The NIST Definition of Cloud Computing," National Institute of Standards and Technology, Version 15, Oct. 2009, 2 pages.

Mell et al., "The NIST Definition of Cloud Computing," National Institute of Standards and Technology, NIST Special Publication 800-145, Sep. 2011, 7 pages.

U.S. Appl. No. 14/299,462, to Hiebert et al., entitled "Adaptive Virtual Machine Request Approver", filed Jun. 9, 2014, assigned to International Business Machines Corporation.

List of IBM Patents or Patent Applications Treated as Related.

* cited by examiner

ADAPTIVE VIRTUAL MACHINE REQUEST APPROVER

CROSS-REFERENCE TO RELATED APPLICATION

This patent application is a continuation application of pending U.S. patent application Ser. No. 14/299,462, filed Jun. 9, 2014, entitled "ADAPTIVE VIRTUAL MACHINE REQUEST APPROVER", which is hereby incorporated herein by reference in its entirety.

BACKGROUND

The present invention relates in general to the data processing field. More particularly, the present invention relates to a method, apparatus and computer program product for automatically approving virtual machine (VM) requests using a tolerance that defines an allowable amount of deviation from preset resource specifications, wherein the tolerance can be varied adaptively based on one or more monitored factors.

SUMMARY

In accordance with some embodiments of the present invention, an adaptive request handler (ARH) receives a virtual machine (VM) request from a user that modifies preset resource specifications of a template or modifies current resource specifications of an active VM associated with preset resource specifications. The ARH determines whether to automatically approve the VM request using a tolerance that defines an allowable amount of deviation from the preset resource specifications. In some embodiments of the present invention, the ARH adaptively varies the tolerance based on one or more monitored factors, such as an aggregate system resource utilization by the user or a group that includes the user and/or a billing history of the user or a group that includes the user. In some embodiments of the present invention, the user selects a template from among a plurality of templates eligible for automatic approval, wherein a plurality of tolerances each defines an allowable amount of deviation from preset resource specifications of a respective one of the eligible templates. The ARH may, in some embodiments of the present invention, vary each of the plurality of tolerances independently based on one or more monitored factors.

BRIEF DESCRIPTION OF THE SEVERAL VIEWS OF THE DRAWINGS

Embodiments of the present invention will hereinafter be described in conjunction with the appended drawings, where like designations denote like elements.

DETAILED DESCRIPTION

Figure 1:
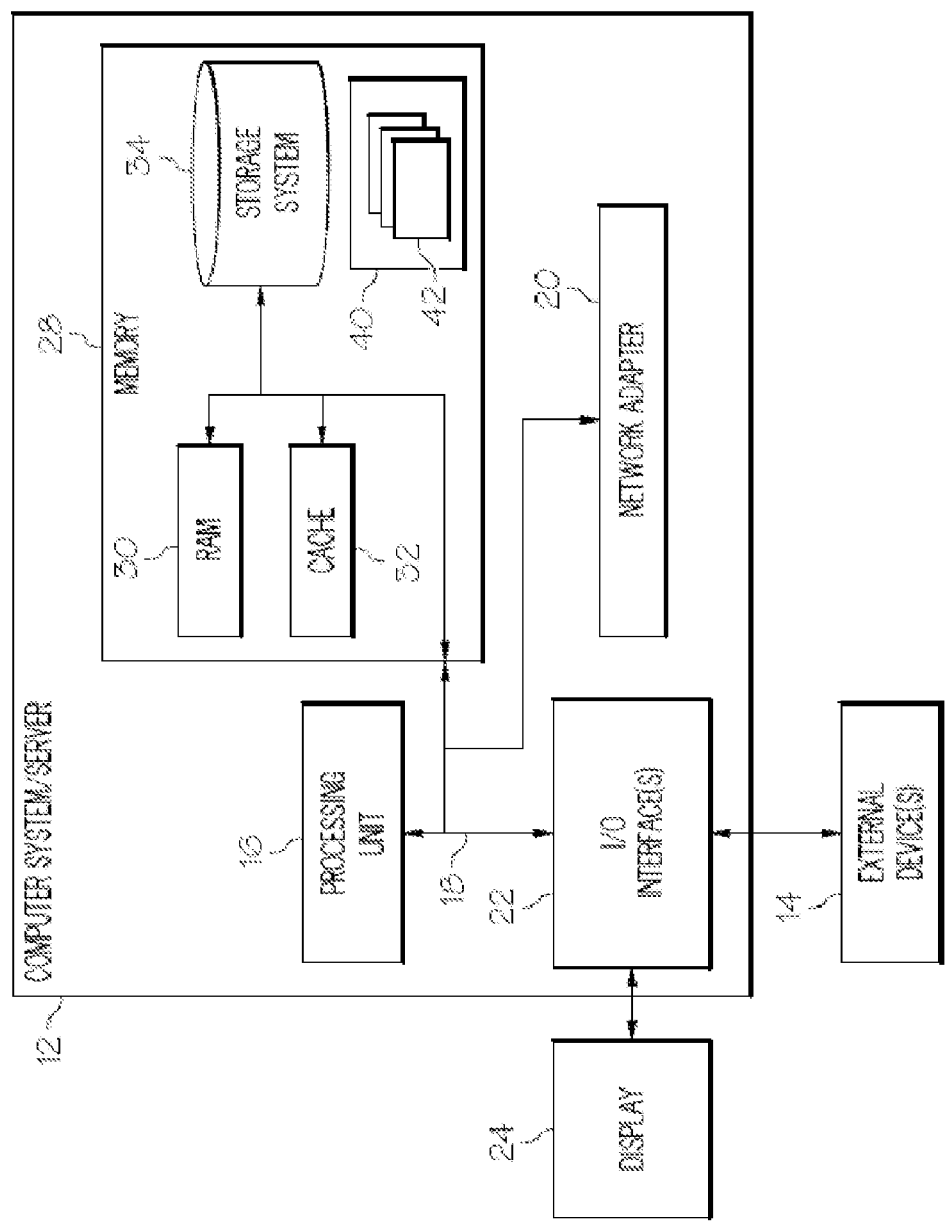
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
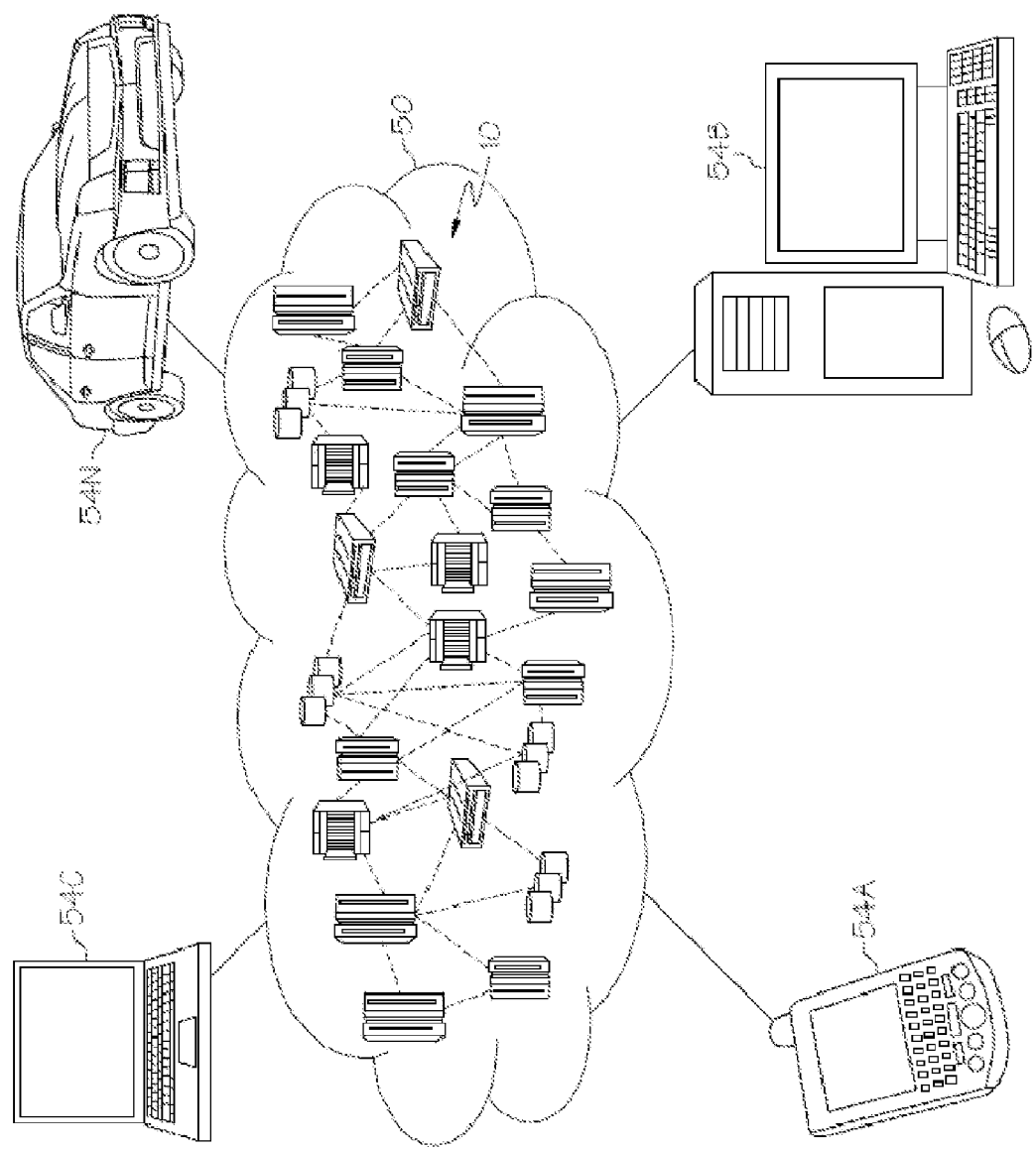
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
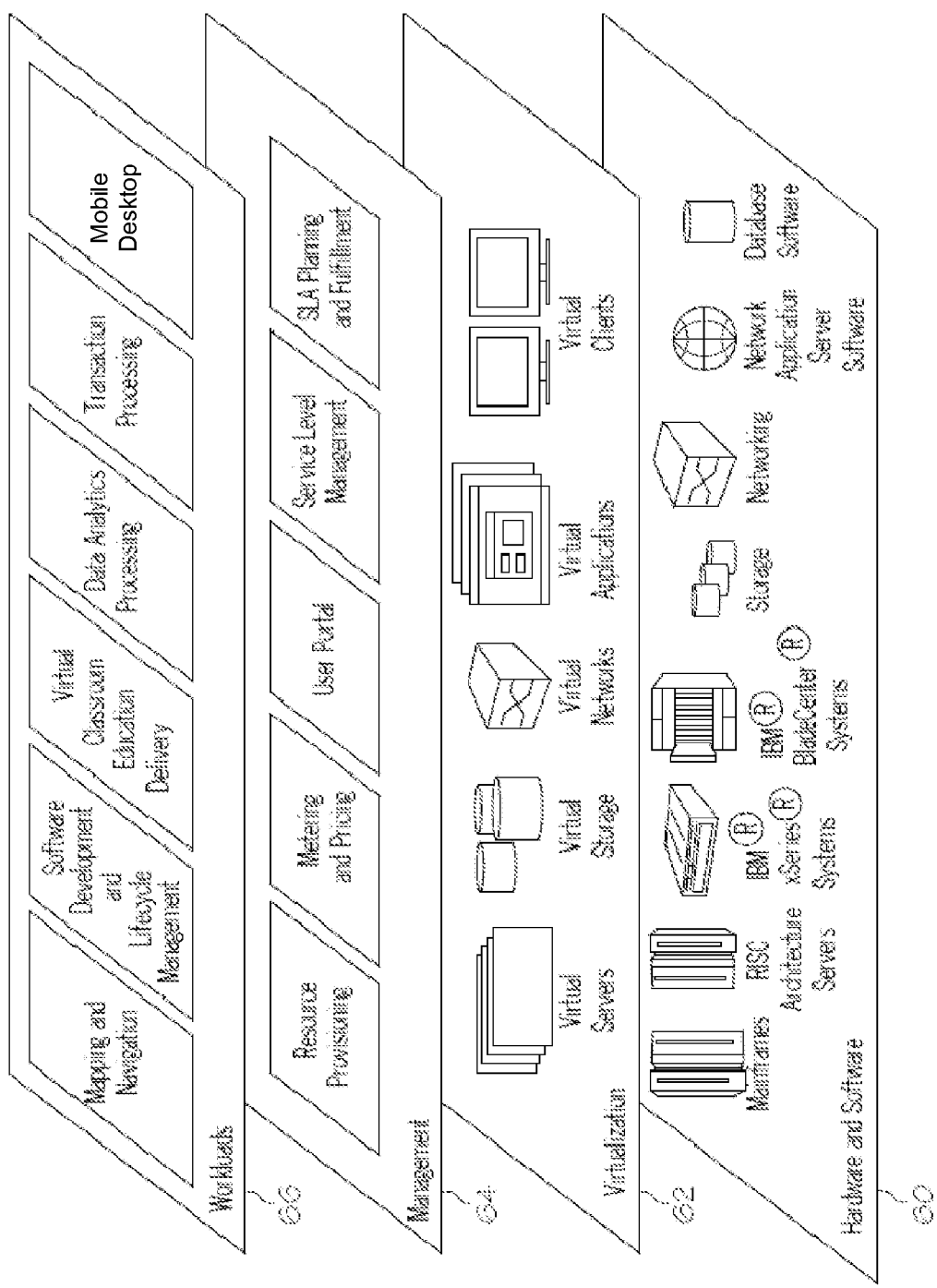
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

New cloud technology, such as IBM SmartCloud Entry, allows users (including non-IT users) to deploy and modify their own virtual machines (VMs) quickly and easily. An approval system is setup whereby requests for new or changed VMs are sent to the IT administrator for approval. Requests for new or changed VMs are referred to as "VM requests". Each VM request is typically based on a defined image (e.g., a "template"). This manual approval process affords the IT administrator some control on the number of VMs deployed and the amount of resources used thereby. Unfortunately, in a large environment, with thousands of defined images (templates) and many thousands of users, the number of VM requests can quickly become overwhelming, resulting in the IT administrator becoming a bottleneck for approval of VM requests.

In accordance with some embodiments of the present invention, a decision of whether or not to approve VM request is made automatically without requiring the approval of VM requests by the IT administrator. Instead, the decision is made automatically using a tolerance that defines an allowable amount of deviation from preset resource specifications of a template or an active VM, wherein the tolerance can be varied adaptively based on one or more monitored factors. No longer does the IT administrator become a bottleneck for approval of VM requests. Accordingly, in accordance with some embodiments of the present invention, the waiting times experienced by users for VM deployment can be significantly reduced.

Figure 4:
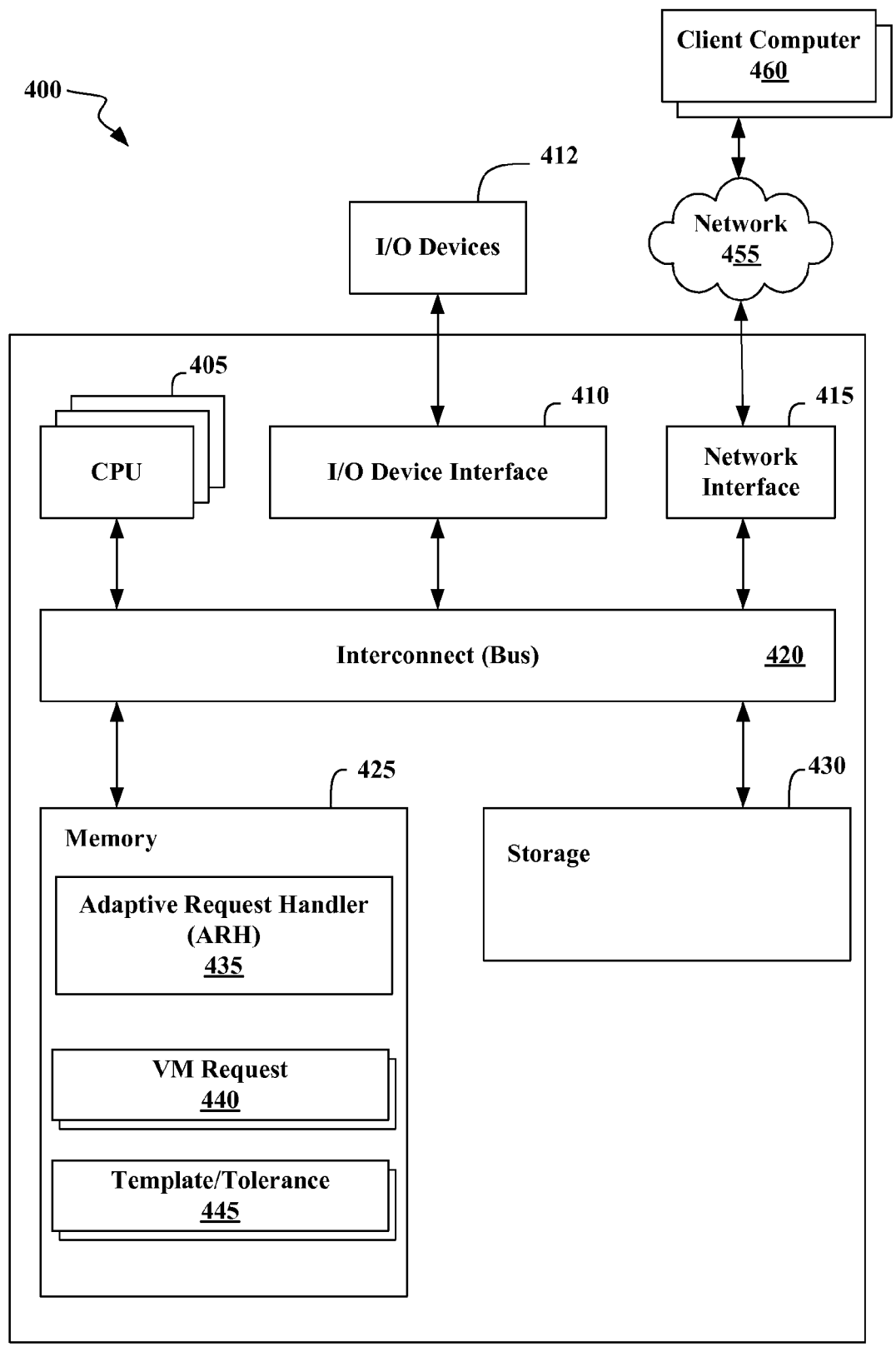
FIG. 4 illustrates an example representation of a computer system connected to a client computer via a network for automatically approving VM requests using a tolerance according to an embodiment of the present invention.

FIG. 4 illustrates an example representation of a computer system 400 connected to one or more client computers 460 via a network 455, according to some embodiments. For the purposes of this disclosure, computer system 400 may represent practically any type of computer, computer system, or other programmable electronic device, including but not limited to, a client computer, a server computer, a portable computer, a handheld computer, an embedded controller, etc. In some embodiments, computer system 400 may be implemented using one or more networked computers, e.g., in a cluster or other distributed computing system.

The computer system 400 may include, without limitation, one or more processors (CPUs) 405, a network interface 415, an interconnect 420, a memory 425, and a storage 430. The computer system 400 may also include an I/O device interface 410 used to connect I/O devices 412, e.g., keyboard, display, and mouse devices, to the computer system 400.

Each processor 405 may retrieve and execute programming instructions stored in the memory 425 or storage 430. Similarly, the processor 405 may store and retrieve application data residing in the memory 425. The interconnect 420 may transmit programming instructions and application data between each processor 405, I/O device interface 410, network interface 415, memory 425, and storage 430. The interconnect 420 may be one or more busses. The processor 405 may be a single central processing unit (CPU), multiple CPUs, or a single CPU having multiple processing cores in various embodiments. In one embodiment, a processor 405 may be a digital signal processor (DSP).

The memory 425 may be representative of a random access memory, e.g., Static Random Access Memory (SRAM), Dynamic Random Access Memory (DRAM), read-only memory, or flash memory. The storage 430 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 415 may be configured to transmit data via the communications network 455.

The memory 425 may include an adaptive request handler (ARH) 435, one or more received VM requests 440, and template/tolerance data 445. Although these elements are illustrated as residing in the memory 425, any of the elements, or combinations thereof, may reside in the storage 430 or partially in the memory 425 and partially in the storage 430. The ARH 435 has a set (at least one) of program modules that generally carry out the functions and/or methodologies of embodiments of the invention as described herein.

The network 455 may be any suitable network or combination of networks and may support any appropriate protocol suitable for communication of data and/or code to/from the server computer system 400 and the client computer system 460. In some embodiments, the network 455 may support wireless communications. In other embodiments, the network 455 may support hardwired communications. The network 455 may be the Internet and may support Internet Protocol in some embodiments. In other embodiments, the network 455 may be implemented as a local area network (LAN) or a wide area network (WAN). The network 455 may also be implemented as a cellular data network. Although the network 455 is shown as a single network in the figures, one or more networks of the same or different types may be included.

The client computer system 460 may include some or all of the hardware and software elements of the computer system 400 previously described. As shown, there may be one or more client computers 460 connected to the computer system 400 via the network 455. In some embodiments, one or more client computers 460 may send the VM request 440 by network 455 to computer system 400.

Figure 5:
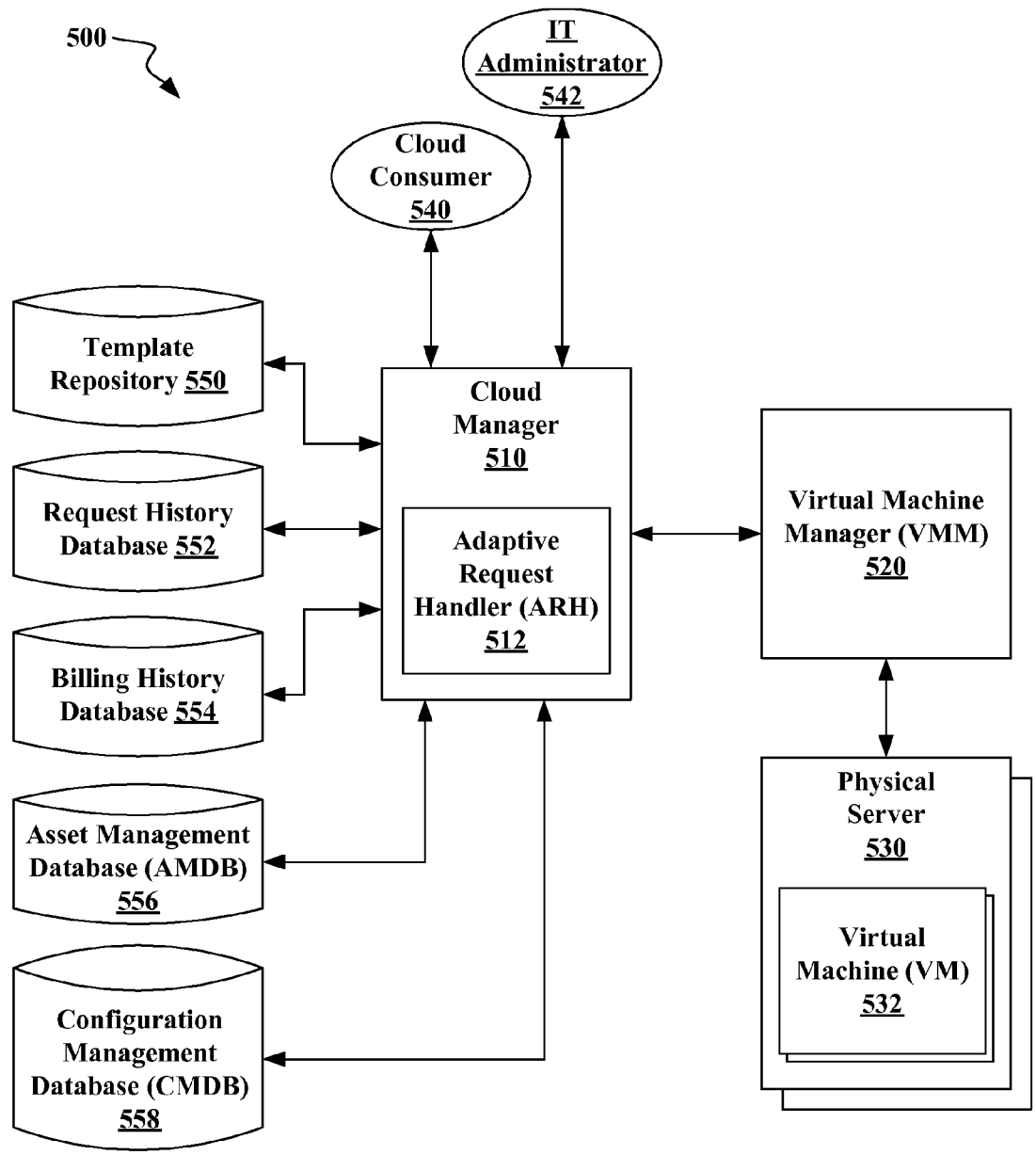
FIG. 5 illustrates a cloud computing system for automatically approving VM requests using a tolerance in accordance with an embodiment of the present invention.

FIG. 5 illustrates a cloud computing system 500 for automatically approving virtual machine (VM) requests using a tolerance in accordance with an embodiment of the present invention.

The cloud computing system 500 comprises a cloud manager 510, a virtual machine manager (VMM) 520, one or more physical servers 530 provisioned into one or more virtual machines (VM) 532, one or more cloud consumers 540, an IT administrator 542, a template repository 550, a request history database 552, a billing history database 554, an asset management database (AMDB) 556, and a configuration management database (CMDB) 558. The cloud manager 510, the VMM 520, the template repository 550, the request history database 552, the billing history database 554, the AMDB 556, the CMDB 558 run on one or more respective conventional computer system/sever. See, for example, descriptions supra of the computer system/server 12 (shown in FIG. 1) and the server computer system 400 (shown in FIG. 4) for details of a conventional computer system.

The cloud manager 510, working in conjunction with virtual machine manager (VMM) 520, manages the virtual machines 532 of the cloud computing system 500. As is conventional, the cloud manager 510 may, for example, optimize the workload distribution among physical servers 530 in accordance with workload balancing policies set by the IT administrator 542. For example, the cloud manager 510 may include conventional components such as the IBM SmartCloud Entry, the IBM Systems Director, the IBM Flex System Manager, the IBM VMControl, and Virtual I/O Server (VIOS).

The cloud manager 510, in accordance with some embodiments of the present invention, also includes an adaptive request handler (ARH) 512. The ARH 512 shown in FIG. 5 may, for example, correspond to the adaptive request handler 435 shown in FIG. 4. The ARH 512, which may be stored in memory, has a set (at least one) of program modules that generally carry out the functions and/or methodologies of embodiments of the invention as described herein.

The ARH 512 receives from the cloud consumer 540 a virtual machine (VM) request based on a template, in accordance with some embodiments of the present invention, and determines whether to automatically approve the VM request using a tolerance that defines an allowable amount of deviation from preset resource specifications of the template. In accordance with some embodiments of the present invention, the ARH 512 adaptively varies the tolerance based on one or more monitored factors, such as an aggregate system resource utilization by the cloud consumer 540 or a group that includes the cloud consumer 540, or an unpaid balance reflected in a billing history of the cloud consumer 540 or a group that includes the cloud consumer 540. For example, the ARH 512 may adaptively vary the tolerance by using information accessed from various databases (e.g., the temple repository 550, the request history database 552, the billing history database 554, the asset management database (AMDB) 556, and the configuration management database (CMDB) 558).

The virtual machine manager (VMM) 520 monitors and manages the physical servers 530 and the virtual machines (VMs) 532 running on the physical servers 530. For example, the cloud manager 510 receives performance data of the cloud computing system 500 from the VMM 520. As is conventional, the cloud manager 510 automatically controls the allocation of the VMs 532 over the physical servers 530 by use of the VMM 520, communicating via, inter alia, hypervisors, VMM application programming interfaces (APIs), and the like. The VMM 520 receives requests for virtual operations and physical operations from the cloud manager 510 and performs adding, moving, deleting, suspending virtual machines to and from respective physical machines, changing configuration of virtual machine assignment for respective physical servers. Examples of VMM 520 may be, inter alia, the IBM Power Systems Hardware Management Console (HMC) or the IBM Integrated Virtualization Manager (IVM). In some embodiments of the present invention, the VMM 520 and the cloud manager 510 may be combined into one software module.

Each of the physical servers 530 is a conventional computer system/server that runs zero, one or more virtual machines 532. As is conventional, the virtual machines 532 may be deployed using templates. A template is an image of a virtual machine that is used to create a new virtual machine. Each template defines a virtual machine in terms of resource specifications (e.g., memory and CPU settings, and VM expiration period). The resource specifications of a template are also referred to as the template's "configuration parameters".

The cloud consumer 540, in accordance with some embodiments of the present invention, is a human user requesting deployment and/or requesting modification of a virtual machine 532 by interacting with the cloud manager 510. In accordance with other embodiments of the present invention, the cloud consumer 540 is a software program or automated process. In accordance with some embodiments of the present invention, the cloud consumer 540 interacts with the cloud manager 510 using a self-service web portal to send a virtual machine (VM) request based on a template to the ARH 512 of the cloud manager 510. The cloud consumer 540 selects the template from a list of eligible templates, i.e., templates eligible for automatic approval. Each eligible template has preset resource specifications that may be modified by the cloud consumer 540. The list of eligible templates is essentially an "image catalog" of appliances that are eligible for automatic approval. In general, the term "image catalog" describes a list of appliances that users can provision.

Once the ARH 512 receives the VM request from cloud consumer 540, the ARH 512 determines whether or not to automatically approve the VM request. The ARH 512 also adds the VM request to the request history database 552.

The IT administrator 542 is a human user configuring and monitoring operations of the cloud computing system 500 by interacting with the cloud manager 510. As is conventional, the IT administrator 542 may set policies controlling workload balancing, defines costs for operating the cloud computing system 500, and creates, deletes, and reconfigures virtual machines in respective virtual servers. As is also conventional, the IT administrator 542 can configure the parameters of an appliance and place them in the appropriate project (grouping) for assigning access. An appliance, which is used to create new virtual machines, is a master disk image of a virtual machine and its associated configuration parameters. Workloads and appliances may be grouped in projects by the IT administrator 542.

In accordance with some embodiments of the present invention, the IT administrator 542 also interacts with the cloud manager 510 using a cloud administrator web portal to select templates eligible for automatic approval, set resource specifications for eligible templates, and define a tolerance for each eligible template. Also in accordance with some embodiments of the present invention, the IT administrator 542 may manually approve, modify or deny VM requests from the cloud consumer 540 that are not automatically approved (or are provisionally approved) by the ARH 512 of the cloud manager 510.

The template repository 550 stores template/tolerance data including, but not limited to, data regarding the templates and data regarding the eligible templates and the tolerances. The data regarding the templates may, for example, include a list of the templates along with any preset resource specifications for each template. Each eligible template is stored in the template repository 550 in such a manner as to identify the preset resource specifications and the tolerance associated therewith. The data regarding the eligible templates and the tolerances may, for example, include a list of the eligible templates, the preset resource specifications for each eligible template, and the tolerance for each eligible template.

In some embodiments of the present invention, the template/tolerance data stored in the template repository 550 may include zero, one or more adjusted tolerances for each eligible template in addition to, or in lieu of, the original tolerance for each eligible template. The data regarding eligible templates and the tolerances may, for example, include a list of the eligible templates, the preset resource specifications for each eligible template, the original tolerance for each eligible template, and zero, one or more adjusted tolerances for each eligible template. For example, two different adjusted tolerances may be each associated with the same eligible template for two different cloud consumers, respectively. In such an example, an eligible template may have an original tolerance for a first cloud consumer (or a group that includes the first cloud consumer), a first adjusted tolerance for a second cloud consumer (or a group that includes the second cloud consumer), and a second adjusted tolerance for a third cloud consumer (or a group that includes the third cloud consumer).

The request history database 552 stores historical data regarding what templates have been requested by what cloud consumer. This historical data may include, but are not limited to, the Customer ID of the cloud consumer that sent the VM request, the template identified in the VM request, any modification to the preset resource specifications for the template identified in the VM request, the date and time when the VM request was received, and the disposition of the VM request (e.g., whether the VM request was approved, denied, or modified by an IT administrator and, if modified, how the VM request was modified by the IT administrator).

The billing history database 554 stores billing history data regarding the billing history for all accounts. Any user (e.g., cloud consumers and/or groups that include cloud consumers) who can log in to the cloud manager can be assigned an account. The workloads that are owned by this user are charged to that account. A user can be a member of only one account at a time. The account is typically identified by a Customer ID, i.e., the name of the owner of the workloads. For each account, the billing history data includes, but is not limited to, the Customer ID and an unpaid balance. The billing history data may also include, for each cloud consumer, an unpaid balance limit that defines a limit with respect to the unpaid balance for the cloud consumer. For example, in some embodiments of the present invention, if the unpaid balance of a cloud consumer is greater than the unpaid balance limit, the tolerance is adjusted to be more restrictive for the cloud consumer.

The asset management database (AMDB) 556 stores software asset information regarding a number of available software licenses, a number of installed software licenses, and the like.

The configuration management database (CMDB) 558 stores information about dependencies between the physical servers 530 and the virtual machines 532 running on the respective physical servers 530 and topology information as the virtual machine assignment for respective physical servers. As is conventional, the cloud manager 510 may update the CMDB 558 with new topology information resulting from optimization of workload distribution among physical servers. The CMDB 558 may also store information about constraints of the cloud computing system 500, such as hardware resources of the respective physical servers 530 available for virtual machine assignment.

Figure 6:
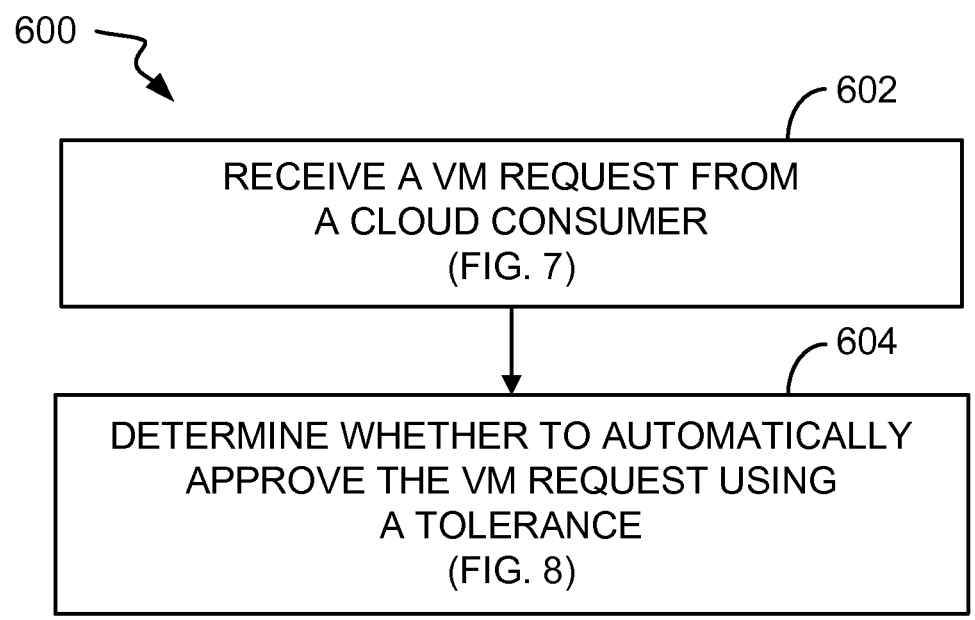
FIG. 6 is a flow diagram illustrating a method for automatically approving VM requests using a tolerance in accordance with the some embodiments of the present invention.

FIG. 6 is a flow diagram illustrating a method for automatically approving VM requests using a tolerance in accordance with the some embodiments of the present invention. In the method 600, the steps discussed below (steps 602-604) are performed. The method 600 begins as the adaptive request handler (ARH) receives a VM request from a cloud consumer (step 602). An exemplary method of implementing step 602 is shown FIG. 7, described below.

Figure 8:
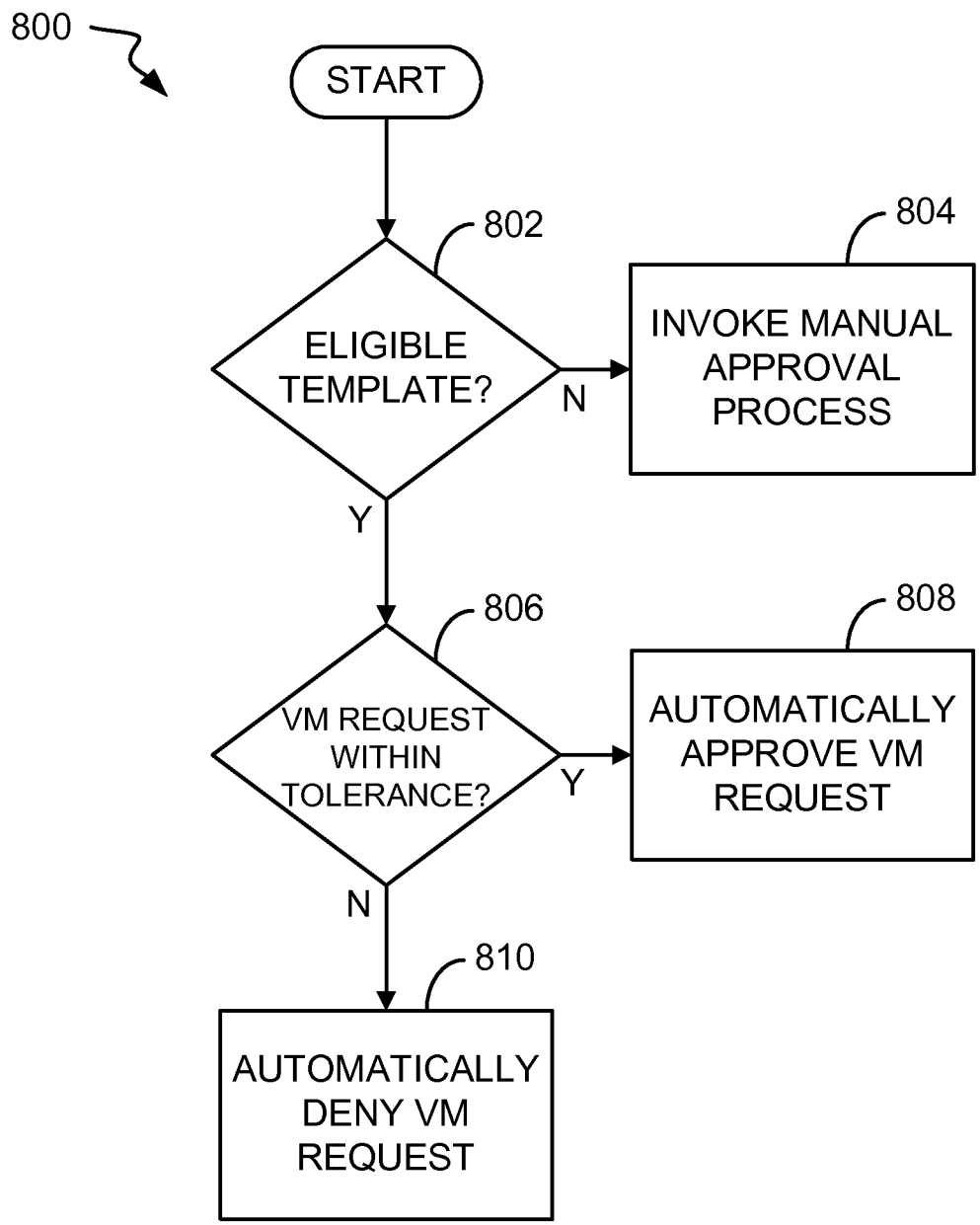
FIG. 8 is a flow diagram illustrating an exemplary method (corresponding to step 604 shown in FIG. 6) for determining whether to automatically approve a VM request using a tolerance in accordance with the some embodiments of the present invention.

Then, the method 600 continues as the ARH determines whether to automatically approve the VM request (received in step 602) using a tolerance (step 604). An exemplary method of implementing step 604 is shown in FIG. 8, described below.

Hence, in accordance with some embodiments of the present invention, the waiting times experienced by cloud consumers for VM provisioning can be reduced because the decision whether or not to approve VM request is made automatically without requiring the approval of VM requests by the IT administrator. No longer does the IT administrator become a bottleneck for approval of VM requests.

Figure 7:
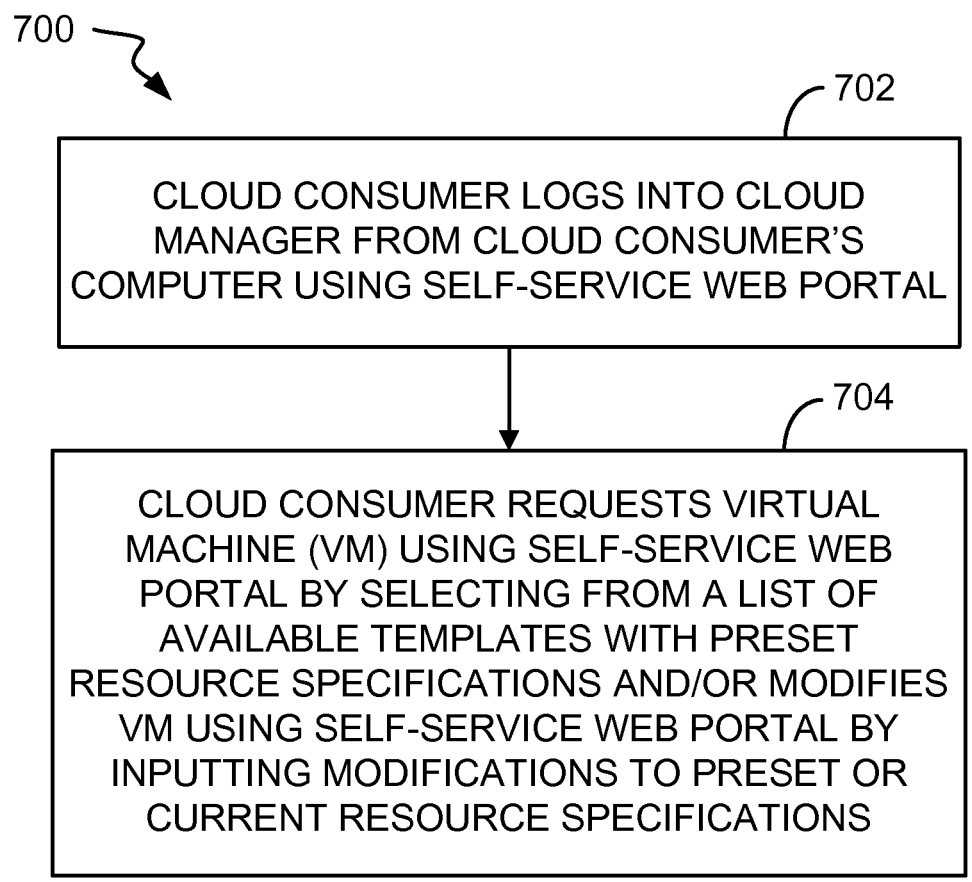
FIG. 7 is a flow diagram illustrating an exemplary method (corresponding to step 602 shown in FIG. 6) for receiving a VM request from a cloud consumer in accordance with the some embodiments of the present invention.

FIG. 7 is a flow diagram illustrating an exemplary method 700 for receiving a VM request from a cloud consumer (step 602 shown in FIG. 6) in accordance with the some embodiments of the present invention. In the method 700, the steps discussed below (steps 702-704) are performed. The exemplary method 700 utilizes a self-service web portal feature of the cloud manager. The cloud consumer interacts with a virtual server running the cloud manager using a self-service web portal on the cloud consumer's computer. The self-service web portal may, for example, be downloaded to a web browser on the cloud consumer's computer in response to the cloud consumer having clicked a "request a VM" button on a webpage that the cloud consumer navigated to by drilling down in a company's website. One skilled in the art will appreciate, however, that any number of other methods for receiving a VM request from a cloud consumer may be used in lieu of the exemplary self-service web portal.

The method 700 begins as a cloud consumer logs into the cloud manager from the cloud consumer's computer using a self-service web portal (step 702). This step is conventional. For example, conventional cloud managers such as the IBM SmartCloud Entry feature a self-service web portal that requires the cloud consumer to log into the cloud manager from the cloud consumer's computer.

Then, the method 700 continues as the cloud consumer requests a VM using the self-service web portal by selecting from a list of available templates with preset resource specifications (e.g., memory and CPU settings, and VM expiration period) and/or modifies the selected template using the self-service web portal by inputting modifications to the preset resource specifications, or modifies current resource specifications of a live (active) VM associated with preset resource specifications (step 704). This step is conventional. For example, conventional cloud managers such as the IBM SmartCloud Entry feature a self-service web portal that enables a cloud consumer to request a VM by selecting from a list of available templates with preset resource specifications and/or modify the selected template by inputting modifications to the preset resource specifications.

In step 704, the cloud consumer's computer generates a "VM request" based on the information input by the cloud consumer (e.g., the selected template and any modification to preset resource specifications of the template, or a modification to current resource specifications of an active VM associated with preset resource specifications), and sends the VM request to the adaptive request handler (ARH) of the cloud manager. The VM request may, for example, be generated and sent in response to the cloud consumer having clicked a "deploy" button on the self-service web portal. In general, the VM request is generated by the cloud consumer's computer based on the information input by the cloud consumer, such as the information the cloud consumer provided via the self-service web portal and/or information the cloud consumer or the cloud consumer's computer has provided via some other mechanism.

The VM request generally includes numerous data elements, such as Customer ID, VM Type, Request Start Time, Request End Time, etc. One or more of these data elements identifies the template selected by the cloud consumer and any modification to the preset resource specifications input by the cloud consumer. One skilled in the art will appreciate that any type of data file may be generated and sent in step 704 as the "VM request".

FIG. 8 is a flow diagram illustrating an exemplary method 800 for determining whether to automatically approve a VM request using a tolerance (step 604 shown in FIG. 6) in accordance with the some embodiments of the present invention. The method 800 begins as the adaptive request handler (ARH) determines whether VM request received from a cloud consumer's computer is a template eligible for automatic approval (step 802). The ARH may, for example, parse the VM request into data elements, access the template repository, and compare the parsed data element that identifies the template selected by the cloud consumer against the eligible templates stored in the template repository. As described below, with reference FIG. 10, eligible templates are templates that were (previously) selected by an IT administrator as eligible for automatic approval and stored as template/tolerance data in the template repository. If the VM request is not eligible for automatic approval (step 802=No), the method 800 continues by the ARH invoking the manual approval process (step 804). The manual approval process is invoked to require manual approval of the VM request by an IT administrator before the VM can be deployed. Under the manual approval process, the IT administrator can either manually approve the VM request "as-is", or manually adjust or reject the VM request.

If the VM request is eligible for automatic approval (step 802=Yes), the method 800 continues as the ARH determines whether the VM request is within a tolerance associated with the selected template (step 806). The tolerance associated with the selected template defines an allowable amount of deviation from preset resource specifications of the selected template. The ARH may, for example, parse the VM request into data elements, access the template repository, and compare the parsed data element that identifies any modification to the preset resource specifications input by the cloud consumer against the tolerance associated with the selected template stored in the template repository. As described below, with reference to FIG. 10, a tolerance was (previously) defined by an IT administrator for each eligible template and stored as template/tolerance data in the template repository. For example, the tolerance associated with the selected template may have been defined by the IT administrator to be twice the selected template's preset resource specifications.

If the VM request is within the tolerance associated with the selected template (step 806=Yes), the method 800 continues as the ARH automatically approves the VM request (step 808). The ARH may, for example, send a request to virtual machine manager (VMM), and the conventional deployment process begins. In accordance with some embodiments of the present invention, in step 808, the ARH may automatically approve the VM request on a provisional basis, i.e., subject to a subsequent manual review by an IT administrator.

If the VM request is outside the tolerance associated with the selected template (step 806=No), the method 800 continues as the ARH automatically denying the VM request (step 810). The ARH may, for example, send a message to the cloud consumer's computer informing the cloud consumer that the VM request has been denied. Step 810 may, in accordance with some embodiments of the present invention, automatically deny the VM request on a provisional basis, and then the method 800 would flow to step 804 to invoke a manual approval process.

For example, the tolerance may be defined to be twice the size of the template's preset resource specifications (also referred to herein as the "default image"). Hence, if the default image has 2 CPUs and 2 GB of RAM and the tolerance is defined as twice the default image, for example, a VM request will be automatically approved as long as the VM request has no more than 4 CPUs and 4 GB of RAM (i.e., 2× the template's preset resource specifications). Conversely, for the same default image and the same tolerance, a VM request will be automatically rejected if the VM request has more than 4 CPUs or more than 4 GBs of RAM (e.g., if a typo with respect to the CPUs needed requests 20,000 CPUs).

In the method 800, the ARH determines whether to automatically approve a VM request using a tolerance that is associated with an eligible template (i.e., a template that is eligible for automatic approval). One skilled in the art will appreciate, however, that the method 900 is also applicable to determining whether to automatically approve a VM request using a tolerance that is associated with an eligible live (active) VM (i.e., a live VM that is eligible for automatic approval).

Figure 9:
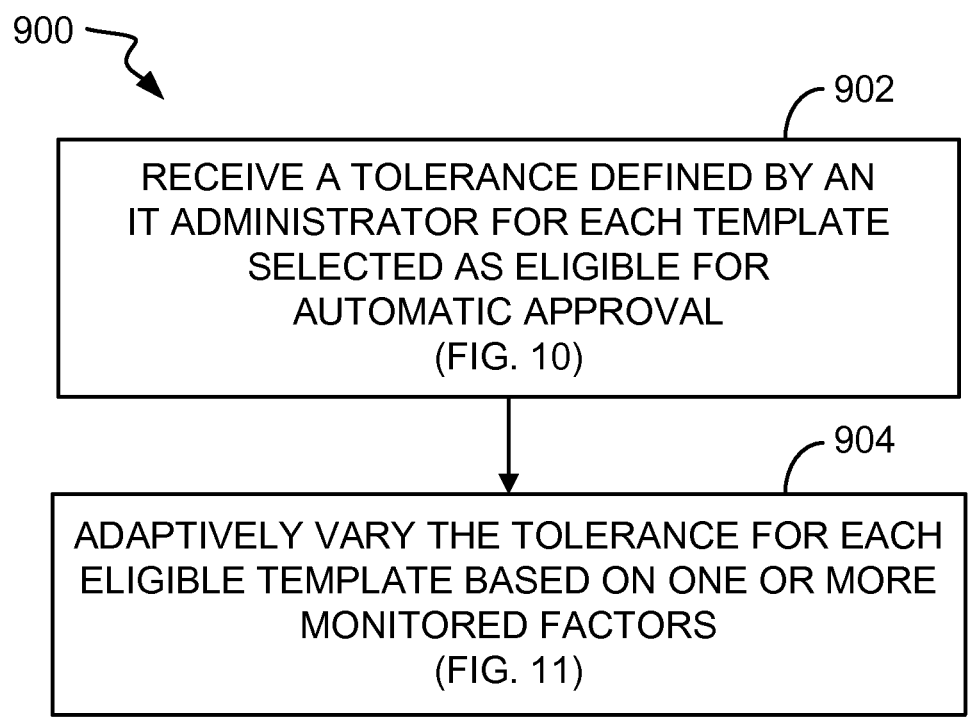
FIG. 9 is a flow diagram illustrating a method for defining a tolerance and adaptively varying the tolerance over time in accordance with the some embodiments of the present invention.

FIG. 9 is a flow diagram illustrating a method 900 for defining a tolerance and adaptively varying the tolerance over time in accordance with the some embodiments of the present invention. In the method 900, the steps discussed below (steps 902-904) are performed. The method 900 begins as the adaptive request handler (ARH) receives a tolerance defined by an IT administrator for each template selected by the IT administrator as eligible for automatic approval (step 902). An exemplary method of implementing step 902 is shown FIG. 10, described below.

Figure 11:
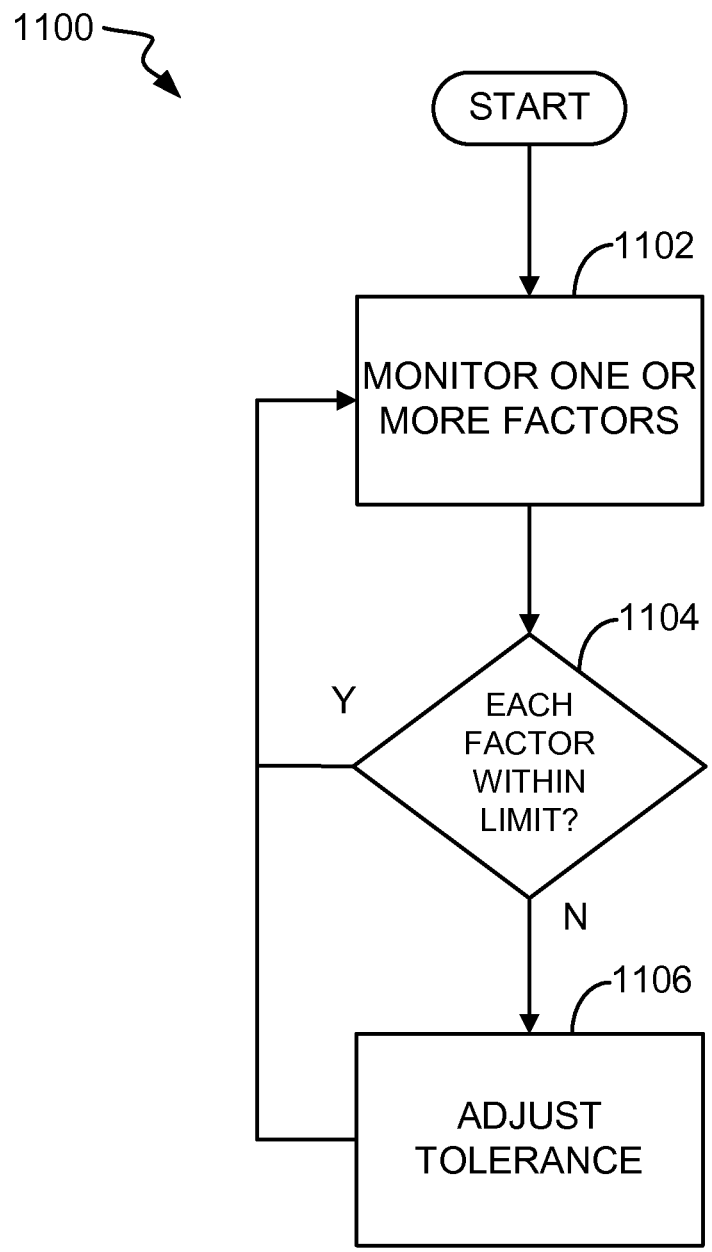
FIG. 11 is a flow diagram illustrating an exemplary method (corresponding to step 904 shown in FIG. 9) for adaptively varying the tolerance for each eligible template based on one or more monitored factors in accordance with the some embodiments of the present invention.

Then, the method 900 continues as the ARH adaptively varies the tolerance for each eligible template (i.e., each template selected as eligible for automatic approval) based on one or more monitored factors (step 904). An exemplary method of implementing step 904 is shown in FIG. 11, described below.

In the method 900, a tolerance is defined and adaptively varied for each of one or more eligible templates (i.e., templates that are eligible for automatic approval). One skilled in the art will appreciate, however, that the method 900 is also applicable to defining a tolerance and adaptively varying the tolerance for each of one or more eligible live VMs (i.e., live VMs that are eligible for automatic approval).

Figure 10:
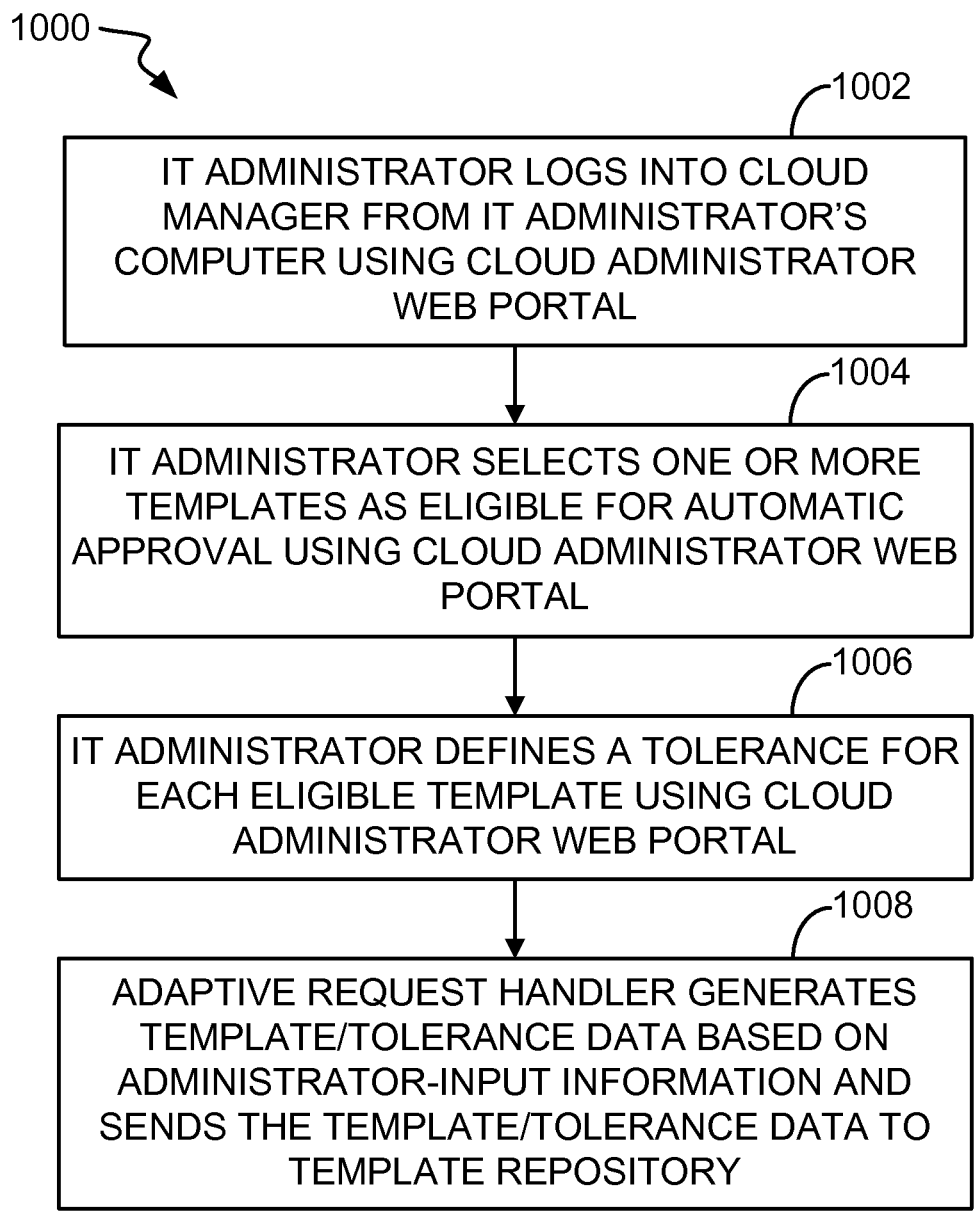
FIG. 10 is a flow diagram illustrating an exemplary method (corresponding to step 902 shown in FIG. 9) for receiving a tolerance defined by an IT administrator for each template selected as eligible for automatic approval in accordance with the some embodiments of the present invention.

FIG. 10 is a flow diagram illustrating an exemplary method 1000 for receiving a tolerance defined by an IT administrator for each template selected as eligible for automatic approval (step 902 shown in FIG. 9) in accordance with the some embodiments of the present invention. The method 1000 utilizes a cloud administrator web portal feature of the cloud manager. The IT administrator interacts with a virtual server running the cloud manager using a cloud administrator web portal on the IT administrator's computer. One skilled in the art will appreciate, however, that any number of other methods for receiving a tolerance defined by an IT administrator for each template selected as eligible for automatic approval may be used in lieu of the exemplary cloud administrator web portal.

The method 1000 begins as an IT administrator logs into the cloud manager from the IT administrator's computer using a cloud administrator web portal (step 1002). This step is conventional. For example, conventional cloud managers such as the IBM SmartCloud Entry feature a cloud administrator web portal that requires the IT administrator to log into the cloud manager from the IT administrator's computer.

Then, the method 1000 continues as the IT administrator selects one or more templates as eligible for automatic approval using the cloud administrator web portal (step 1004). For example, a cloud administrator web portal of a conventional cloud manager such as the IBM SmartCloud Entry may be enhanced to enable an IT administrator to select one or more templates as eligible for automatic approval. The cloud administrator web portal may, for example, display a list of available templates with preset resource specifications in step 1004 from which the IT administrator selects one or more eligible templates. The templates selected by the IT administrator will be eligible for automatic approval.

The cloud administrator web portal may, in another example, display a list of available templates with configurable resource specifications (i.e., configurable by the IT administrator to generate preset resource specifications) in step 1004 from which the IT administrator selects one or more eligible templates and configures the resource specifications of each of the one or more eligible templates to generate preset resource specifications. The templates selected and configured by the IT administrator will be eligible for automatic approval.

The method 1000 then continues as the IT administrator defines a tolerance for each eligible template using the cloud administrator web portal (step 1006). For example, a cloud administrator web portal of a conventional cloud manager such as the IBM SmartCloud Entry may be enhanced to enable an IT administrator to define a tolerance for each of the one or more templates selected as eligible for automatic approval. The cloud administrator web portal may, for example, display a list of eligible templates with preset resource specifications and prompt the IT administrator to input a tolerance for each eligible template as a multiple (e.g., 2×) of the preset resource specifications. For example, the IT administrator may input a tolerance for some eligible templates that is relatively less restrictive (e.g., twice those particular eligible templates' preset resource specifications) and input a tolerance for other eligible templates that is relatively more restrictive (e.g., 1.1 times those particular eligible templates' preset resource specifications). This example is set forth for purposes of illustration, not limitation.

One skilled in the art will appreciate the tolerance for each eligible template may be defined in a myriad of ways. The tolerance for an eligible template may, in another example, be defined by the IT administrator using different multiples for different resource components of a particular eligible template's preset resource specifications (e.g., 1.5 times the CPU setting component of a particular eligible template's preset resource specifications, 2 times the memory setting component of that same eligible template's preset resource specifications, and 1.2 times the VM expiration period setting component of that same eligible template's preset resource specifications). In yet another example, a single tolerance may be defined by the IT administrator globally so that all eligible templates have the same tolerance.

Then, the method 1000 continues as the ARH generates template/tolerance data based on the eligible templates selected by the IT administration and the tolerance defined by the IT administrator for each eligible template, and sends the template/tolerance data to the template repository (step 1008). The template/tolerance data associates each eligible template with a tolerance (and/or, optionally, with one or more adjusted tolerances). The template/tolerance data may, for example, be generated and sent in response to the IT administrator having clicked a "save" button on the cloud administrator web portal. One skilled in the art will appreciate that any type of data file may be generated and sent in step 1008 as the "template/tolerance data".

In the method 1000, a tolerance is defined for each of one or more eligible templates (i.e., templates that are eligible for automatic approval). One skilled in the art will appreciate, however, that the method 1000 is also applicable to defining a tolerance for each of one or more eligible live VMs (i.e., live VMs that are eligible for automatic approval).

FIG. 11 is a flow diagram illustrating an exemplary method 1100 for adaptively varying the tolerance for each eligible template based on one or more monitored factors (step 904 shown in FIG. 9) in accordance with the some embodiments of the present invention. The method 1100 begins as the ARH monitors one or more factors (step 1102). For example, the ARH may monitor an aggregate system resource utilization by the cloud consumer (or a group that includes the cloud consumer). In another example, the ARH may monitor an unpaid balance reflected in a billing history of the cloud consumer (or a group that includes the cloud consumer).

Then, the method 1100 continues as the ARH determines whether the one or more monitored factors is within a limit (step 1104). For example, the ARH may determine whether the monitored aggregate system resource utilization by the cloud consumer (or a group that includes the cloud consumer) is within a limit for aggregate system resource utilization. In another example, the ARH may determine whether the monitored unpaid balance reflected in the billing history of the cloud consumer (or a group that includes the cloud consumer) is within an unpaid balance limit.

If each of the one or more monitored factors is within the limit (step 1104=Yes), the method 1100 returns to step 1102 wherein the ARH continues monitoring to one or more factors.

If one or more monitored factors is outside the limit (step 1104=No), the method 1100 continues as the ARH adjusts the tolerance (step 1106). For example, the ARH may adjust the tolerance to make it more restrictive if the monitored aggregate system resource utilization by the cloud consumer (or a group that includes the cloud consumer) exceeds the limit for aggregate system resource utilization. In another example, the ARH may adjust the tolerance to make it more restrictive if the monitored unpaid balance in the billing history of the cloud consumer (or a group that includes the cloud consumer) exceeds the unpaid balance limit.

After the ARH adjusts the tolerance in step 1106, the method 1100 returns to step 1102 wherein the ARH continues to monitor one or more factors. In accordance with some embodiments of the present invention, the ARH may adjust the tolerance repeatedly by a fixed adjustment amount (e.g., 0.1). For example, the ARH may increase the tolerance (i.e., make the tolerance less restrictive) by an adjustment amount (e.g., 0.1) after every successful manual approved request and/or the ARH may decrease the tolerance (i.e., make the tolerance more restrictive) by an adjustment amount (e.g., 0.1) after every rejected or manually overridden request. In accordance with other embodiments of the present invention, the ARH may adjust the tolerance repeatedly by adjustment amounts that grow logarithmically or exponentially.

In the method 1100, a tolerance is adaptively varied for each of one or more eligible templates (i.e., templates that are eligible for automatic approval). One skilled in the art will appreciate, however, that the method 1100 is also applicable to adaptively varying a tolerance for each of one or more eligible live VMs (i.e., live VMs that are eligible for automatic approval).

In accordance with some embodiments of the present invention, the tolerance T is automatically adjusted under several different scenarios described below. The exemplary scenarios described below employ various monitored factors. The particular monitored factors set forth in the exemplary scenarios below are for purposes of illustration, not limitation.

Exemplary scenarios where the tolerance T becomes more restrictive: The tolerance associated with a given template may be adjusted to become more restrictive by reducing the multiplier used to define the tolerance in terms of that template's preset resource specifications. For example, an original tolerance of 2.0 times the template's preset resource specifications may be adjusted down by an adjustment amount of 0.1 times the template's resource specifications so as to become an adjusted tolerance of 1.9 times the template's present resource specifications. In the above example, the multipliers and the adjustment amount are for purposes of illustration, not limitation. Typically, for a given template, the adjusted tolerance is greater than or equal to 1.0 times the template's preset resource specifications. However, the adjusted tolerance, at least in some scenarios, can go less than 1.0 times the template's preset resource specifications. In an exemplary more-restrictive T scenario, a user has more VMs running (e.g., a user has 100 VMs continuing to run over the last few months), T may be adjusted to go down by an adjustment amount (e.g., 0.1 times the template's resource specifications) for every VM that user has running or requests. In another exemplary more-restrictive T scenario, a user approaches an aggregate quota of resources that user is allowed to consume (as a group or as an individual), T may be adjusted to go down by an adjustment amount (e.g., 0.1 times the template's resource specifications) for every VM that user (as a group or as an individual) has running or requests. In yet another exemplary more-restrictive T scenario, the cloud runs low on hardware resources, T may be adjusted to go down by an adjustment amount (e.g., 0.1 times the template's resource specifications) for every VM any user has running or requests. In still another exemplary more-restrictive T scenario, a large number of requests occur at once (e.g., 100 VM requests come in at once), T may be adjusted to go down by an adjustment amount (e.g., 0.1 times the template's resource specifications) for every VM any user has running or requests.

Exemplary scenarios where the tolerance T becomes less restrictive: The tolerance associated with a given template may be adjusted to become less restrictive by increasing the multiplier used to define the tolerance in terms of that template's preset resource specifications. For example, an original tolerance of 2.0 times the template's preset resource specifications may be adjusted up by an adjustment amount of 0.1 times the template's resource specifications so as to become an adjusted tolerance of 2.1 times the template's present resource specifications. In the above example, the multipliers and the adjustment amount are for purposes of illustration, not limitation. In an exemplary less-restrictive T scenario, T is adjusted to become less restrictive for a user (as a group or as an individual) has a long history of having all or most requests approved. For example, over time, the IT test group of an enterprise may have a less restrictive T value than the human resources group of the enterprise.

Exemplary scenarios where the tolerance T becomes more or less restrictive based on the history of previous requests: The history of previous requests may be used to guide the training of a tolerance adjusting algorithm. The adaptive request handler may, for example, include a tolerance adjusting algorithm that learns to adjust T up and down, selectively, by watching manual approval decisions. In an exemplary scenario, user Joe always requests 10 CPUs for a particular VM (e.g., VM_1234) compared to the default 2 CPUs (i.e., the CPU setting of the preset resource specifications of the template that defines VM 1234), and the IT administrator always approves. Over time, T is adjusted to become less restrictive for this particular VM (i.e., VM_1234) at first just for user Joe, but then T is adjusted to become less restrictive for this particular VM (i.e., VM_1234) for all other users, as well. as the IT administrator approves a few other users. Subsequently, user Steve repeatedly requests 10 CPUs for this particular VM (i.e., VM_1234), but the IT administrator always denies the requests (e.g., after the requests are automatically approved on a provisional basis, as described below). Over time, T is adjusted to become more restrictive for this particular VM (i.e., VM_1234) for user Steve.

Exemplary scenarios where the tolerance T becomes more or less restrictive based on costs: T can grow at a slower/faster rate depending on the costs associated with using a VM. Different cloud stacks, as well as images on those stacks, have different pricing for the licenses, hardware (CPU, RAM, storage), etc. In an exemplary scenario, T can be adjusted up and down, selectively, based on the current image or bill, the aggregate price of images of bills, or team/project aggregate costs.

Exemplary scenarios where the tolerance T becomes more or less restrictive based on historic demands: T can take into account historic demands. In an exemplary scenario, resource and billing histories may show that the last day of the month is a high demand day. Accordingly, on the last day of the month, T is automatically adjusted to become more restrictive so that only preapproved request sizes are automatically allowed, and any deviations must go through a manual approval process (IT administrator). On the other hand, resource and billing histories may show that mid-month is a low demand period. Accordingly, during mid-month, T is automatically adjusted to become less restrictive so that automatic approvals are more likely. The resource and billing histories and graphs easily show when the demand is high and T is easily automatically adjusted based on that history.

Thus, the exemplary scenarios described above employ a myriad of monitored factors on which to base the adjustment of the tolerance. In general, T may be adjusted based on any suitable monitored factor(s). Suitable monitored factors include, but are not limited to, the user, the particular or type of VM image, the group or project the user is a member of, the quotas they (i.e., the user, group or project) belong to, the remaining system resources, the history of previous requests, the history of previous bills, the history of previous demands, and the history of past manual approvals.

In accordance with some embodiments of the present invention, as some boundary is approached, T is decreased (i.e., T is made more restrictive) by an adjustment amount (e.g., 0.01) for every active VM of a user or group. For example, the boundary that is being approached may be a quota of resources for the user or group. In accordance with other embodiments of the present invention, as some boundary is approached, T is decreased (i.e., T is made more restrictive) by an adjustment amount (e.g., 0.01) for every VM (globally for all users). For example, the boundary that is being approached may be a quota of resources for the cloud computing system.

In accordance with some embodiments of the present invention, T is increased (i.e., T is made less restrictive) and/or T is decreased (i.e., T is made more restrictive) incrementally by a fixed adjustment amount (e.g., 0.01). In accordance with other embodiments of the present invention, T is increased (i.e., T is made less restrictive) and/or decreased (i.e., T is made more restrictive) incrementally by adjustment amounts that grow logarithmically or exponentially.

In accordance with some embodiments to the present invention, T is increased (i.e., T is made less restrictive) by an adjustment amount (e.g., 0.1) after every successful manual approved request and/or T is decreased (i.e., T is made more restrictive) by an adjustment amount (e.g., 0.1) after every rejected or manually overridden request. A manually overridden request may have requested 4 CPUs, for example, but the IT administrator overrides the request by changing the CPU setting to 3 CPUs and then approves.

In accordance with some embodiments of the present invention, an automatic approval that is a borderline case may be given a status of Approved Pending Further Review (or similar). Thus, the request is provisionally approved and the user may start using their VM, but the request is held and given a special status of Approved Pending Further Review so that the request is held pending a human IT administrative review. The human IT administrator then has the option of agreeing with the approval, modifying or altering the running VM, or in the extreme case, disallowing the request and deleting the running VM immediately or after some timeframe.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One skilled in the art will appreciate that many variations are possible within the scope of the present invention. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. An apparatus comprising:
a memory; and
at least one processor coupled to the memory, and operative to:
receive a tolerance defined by an IT administrator for each of one or more eligible templates selected by the IT administrator as eligible for automatic approval, wherein each of the one or more eligible templates includes preset resource specifications, and wherein, for each of the one or more eligible templates, the tolerance defines an allowable amount of deviation from the preset resource specifications;
receive a virtual machine (VM) request from a user, wherein the VM request modifies the preset resource specifications of a user selected one of the one or more eligible templates or modifies current resource specifications of an active VM associated with the preset resource specifications of a user selected one of the one or more eligible templates;
determine whether the VM request is within the tolerance for the eligible template selected by the user;
automatically approve the VM request if the VM request is determined to be within the tolerance for the eligible template selected by the user;
adaptively vary the tolerance for the eligible template selected by the user based on one or more monitored factors, wherein the one or more monitored factors include an aggregate system resource utilization by the user or a group that includes the user;
wherein a plurality of tolerances defined by the IT administrator each defines an allowable amount of deviation from preset resource specifications of a respective one of the plurality of eligible templates.

2. The apparatus as recited in claim 1, wherein the one or more monitored factors include a billing history of the user or a group that includes the user.

3. The apparatus as recited in claim 1, wherein the user selects the eligible template from among a plurality of eligible templates selected by the IT administrator as eligible for automatic approval, and wherein the at least one processor is further operative to adaptively vary each of the plurality of tolerances independently based on one or more monitored factors.

4. The apparatus as recited in claim 1, wherein the at least one processor is further operative to automatically approve the VM request provisionally subject to a subsequent manual review by an IT administrator.

5. A computer program product comprising:
a plurality of executable instructions provided on non-transitory computer readable media, wherein the executable instructions, when executed by at least one processor in a digital computing device, cause the digital computing device to:
receive a tolerance defined by an IT administrator for each of one or more eligible templates selected by the IT administrator as eligible for automatic approval, wherein each of the one or more eligible templates includes preset resource specifications, and wherein, for each of the one or more eligible templates, the tolerance defines an allowable amount of deviation from the preset resource specifications;
receive a virtual machine (VM) request from a user, wherein the VM request modifies the preset resource specifications of a user selected one of the one or more eligible templates or modifies current resource specifications of an active VM associated with the preset resource specifications of a user selected one of the one or more eligible templates;
determine whether the VM request is within the tolerance for the eligible template selected by the user;
automatically approve the VM request if the VM request is determined to be within the tolerance for the eligible template selected by the user;
adaptively vary the tolerance for the eligible template selected by the user based on one or more monitored factors, wherein the one or more monitored factors include an aggregate system resource utilization by the user or a group that includes the user;
wherein a plurality of tolerances defined by the IT administrator each defines an allowable amount of deviation from preset resource specifications of a respective one of the plurality of eligible templates.

6. The computer program product as recited in claim 5, wherein the one or more monitored factors include a billing history of the user or a group that includes the user.

7. The computer program product as recited in claim 5, wherein the user selects the eligible template from among a plurality of eligible templates selected by the IT administrator as eligible for automatic approval, and wherein plurality of executable instructions further cause the digital computing device to adaptively vary each of the plurality of tolerances independently based on one or more monitored factors.

8. The computer program product as recited in claim 5, wherein plurality of executable instructions further cause the digital computing device to automatically approve the VM request provisionally subject to a subsequent manual review by an IT administrator.

9. An apparatus comprising:
a memory; and
at least one processor coupled to the memory, and operative to:
receive a tolerance defined by an IT administrator for each of one or more eligible templates selected by the IT administrator as eligible for automatic approval, wherein each of the one or more eligible templates includes preset resource specifications, and wherein, for each of the one or more eligible templates, the tolerance defines an allowable amount of deviation from the preset resource specifications;
receive a virtual machine (VM) request from each of a plurality of cloud consumers, wherein each VM request modifies the preset resource specifications of a cloud consumer selected one of the one or more eligible templates or modifies current resource specifications of an active VM associated with the preset resource specifications of a cloud consumer selected one of the one or more eligible templates;
determine, for each VM request, whether the VM request is within the tolerance for the eligible template selected by the cloud consumer;
if the VM request is determined to be within the tolerance for the eligible template selected by the cloud consumer, automatically approve the VM request;
adaptively vary, independently for each cloud consumer, the tolerance for the eligible template selected by the cloud consumer based on one or more monitored factors, wherein two different adjusted tolerances are each associated with the same eligible template for two different cloud consumers, respectively;

wherein a plurality of tolerances defined by the IT administrator each defines an allowable amount of deviation from preset resource specifications of a respective one of the plurality of eligible templates.

\* \* \* \* \*